United States Patent [19]
Kilgariff et al.

[11] Patent Number: 5,999,183
[45] Date of Patent: Dec. 7, 1999

[54] APPARATUS FOR CREATING A SCALABLE GRAPHICS SYSTEM WITH EFFICIENT MEMORY AND BANDWIDTH USAGE

[75] Inventors: Emmett Kilgariff, Sunnyvale; Philip Brown, Santa Cruz, both of Calif.

[73] Assignee: Silicon Engineering, Inc., Scotts Valley, Calif.

[21] Appl. No.: 08/891,280

[22] Filed: Jul. 10, 1997

[51] Int. Cl.$^6$ .................................................. G06T 15/00
[52] U.S. Cl. ......................................................... 345/418
[58] Field of Search .................................. 345/418, 419, 345/513, 512, 508

[56] References Cited

U.S. PATENT DOCUMENTS

| | | | |
|---|---|---|---|
| 5,544,283 | 8/1996 | Kaufman et al. | 345/424 |
| 5,577,229 | 11/1996 | Wakerly | 395/474 |
| 5,684,978 | 11/1997 | Sarma et al. | 395/496 |
| 5,713,011 | 1/1998 | Satoh et al. | 395/556 |
| 5,842,013 | 11/1998 | Kopp | 395/670 |

OTHER PUBLICATIONS

"Microsoft Talisman Q & A" http://www.microsoft.com, Mar. 10, 1997.
"Microsoft Talisman Question & Answers for Technology Initiative" http://www.microsoft.com, Jan. 1997.
"Texture and Rendering Engine Compression (TREC)" http://www.microsoft.com, Jan. 1997.
"Talisman: Commodity Realtime 3D Graphics for the PC" http://www.microsoft.com, Jan. 1997.

*Primary Examiner*—Phu K. Nguyen
*Assistant Examiner*—Cliff N. Vo
*Attorney, Agent, or Firm*—Blakely, Sokoloff, Taylor & Zafman LLP

[57] ABSTRACT

A scalable, three-dimensional (3D) graphics subsystem. The graphics subsystem includes a plurality of graphics modules each including a rendering module and a dedicated memory. In one embodiment, the rendering modules of the graphics modules are coupled together, possibly through a routing device, such that each rendering module views the memory space, formed by all dedicated memory, as one continuous shared memory.

17 Claims, 6 Drawing Sheets

APPARATUS FOR CREATING A SCALABLE GRAPHICS SYSTEM WITH EFFICIENT MEMORY AND BANDWIDTH USAGE

BACKGROUND OF THE INVENTION

1. Field of the Invention

The present invention relates to the field of graphics. More particularly, the present invention relates to a system and method for providing a scalable, three-dimensional graphics subsystem.

2. Description of Related Art

For many years, three-dimensional (3D) graphics subsystems have been scaled in performance. Normally, this scalable performance has been accomplished by adding more memory and graphics hardware to create multiple pipelines as shown in FIG. 1. Each pipeline of the graphics subsystem renders a predetermined portion of entire image.

Referring to FIG. 1, the conventional graphics subsystem 100 receives information associated with an image targeted for display ("targeted image"). Such image information includes vertex coordinates, color, and texture coordinates of one or more triangles forming the targeted image. The image information is input into each of its rendering pipelines $110_1$–$110_n$ ("n" is a positive whole number) to produce display information for each pixel of the targeted image. Each rendering pipeline $110_1$–$110_n$ includes a raster subsystem $120_1$–$120_n$, a texture subsystem $130_1$–$130_n$ coupled to dedicated texture memory $135_1$–$135_n$, and a pixel engine $140_1$–$140_n$ coupled to a selected portion $145_1$–$145_n$ of a frame buffer. The display information generated by each rendering pipeline $110_1$–$110_n$ is appropriately routed to a display monitor through a multiple input multiplexer 150 controlled by a display engine. For clarity sake, the operations of a single rendering pipeline (e.g., rendering pipeline $110_1$) is discussed therein.

For rendering pipeline $110_1$, raster subsystem $120_1$ receives the image information and usually generates XYZ coordinates, texture coordinates and character values (color, translucency and depth) for each pixel of the image. Of course, it is contemplated that these calculations may be successively performed on portions of the targeted image (e.g., one-pixel scan line at a time) rather than the entire targeted image. This architecture has been used by Silicon Graphics, Inc. of Mountain View, Calif.

The texture subsystem $130_1$ receives the texture coordinates and utilizes these texture coordinates to obtain assigned texture values. The texture values are stored in dedicated texture memory $135_1$. Similar for all texture memories $135_1$–$135_n$, texture memory $135_1$ must be sized to accommodate all textures used to create the display image.

A pixel engine $140_1$ receives the pixel coordinates and character values from raster subsystem $120_1$ and texture values from texture memory $135_1$. Based on this information, pixel engine $140_1$ performs pixel level calculations in order to produce the display information. The pixel level calculations include, but are not limited or restricted to depth buffering, shadowing (referred to as "alpha blending") and fragment generation for partially covered pixels. This display information is stored in a first portion $145_1$ of a frame buffer reserved for rendering pipeline $110_1$. Under control of a display engine, the display information is transferred to digital-to-analog (D/A) conversion which are converted into a series of signals. These signals allow the display monitor produce the targeted image.

However, this technique possess a number of disadvantages. For example, in order to provide scalability, multiple texture memories $135_1$–$135_n$ (e.g., dynamic random access memory "DRAM") are required. In the situation where small pixel regions (e.g., 32×32 pixel regions referred to as "chunks") are processed at a time, these texture memories $135_1$–$135_n$ constitute an inefficient use of memory. The reason is that each texture memory $135_1, \ldots, 135_n$ must be sufficiently sized to store all textures of the entire targeted image. Thus, each texture is stored "n" times which substantially increases the costs associated with scaling graphics subsystem 100.

Hence, it would be advantageous to provide a graphics subsystem that offers scalable performance with efficient use of memory.

SUMMARY OF THE INVENTION

The present invention relates to a scalable, three-dimensional (3D) graphics subsystem. The graphics subsystem includes a plurality of graphics modules each including a rendering module and a dedicated memory. In one embodiment, the rendering modules of the graphics modules are coupled together such that each rendering module views the memory space, formed by the dedicated memories, as one continuous shared memory.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention describes a system and method for providing a scalable, three-dimensional (3D) graphics subsystem with efficient memory and bandwidth usage. Although certain illustrative embodiments are described below in order to convey the spirit and scope of the present invention, such embodiments should not be construed as a limitation on the scope of the present invention.

Moreover, various terms are used herein to describe certain structure or characteristics of the present invention. For example, "information" is broadly defined as data, and/or address, and/or control. A "communication line" is also broadly defined as any information-carrying medium (e.g., one or more electrical wires, bus traces, fiber optics, infrared or radio frequency signaling, etc.). A "module" includes a single integrated circuit (IC) device or multiple IC devices operating in combination with each other. These IC devices may be encased within a single or multi-chip IC package, mounted on a common substrate such as a daughter card, or mounted on different substrates interconnected by a common substrate or a communication line. A "port" is broadly defined as a place of access to an IC device, or perhaps an electronic device, which enables serial or parallel communication therewith.

Figure 1:
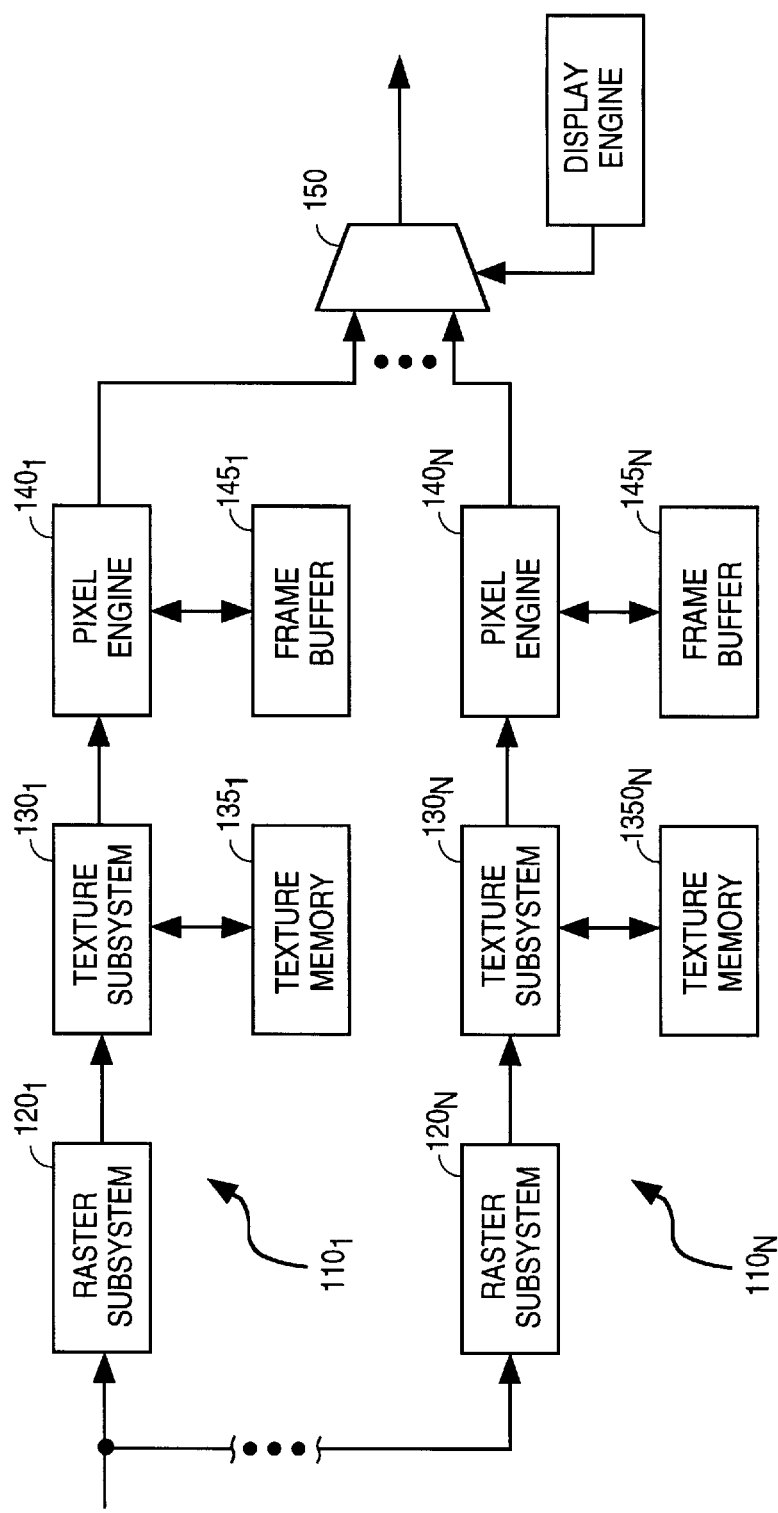
FIGS. 1 illustrates a conventional embodiment of a scalable graphics subsystem.
Figure 2:
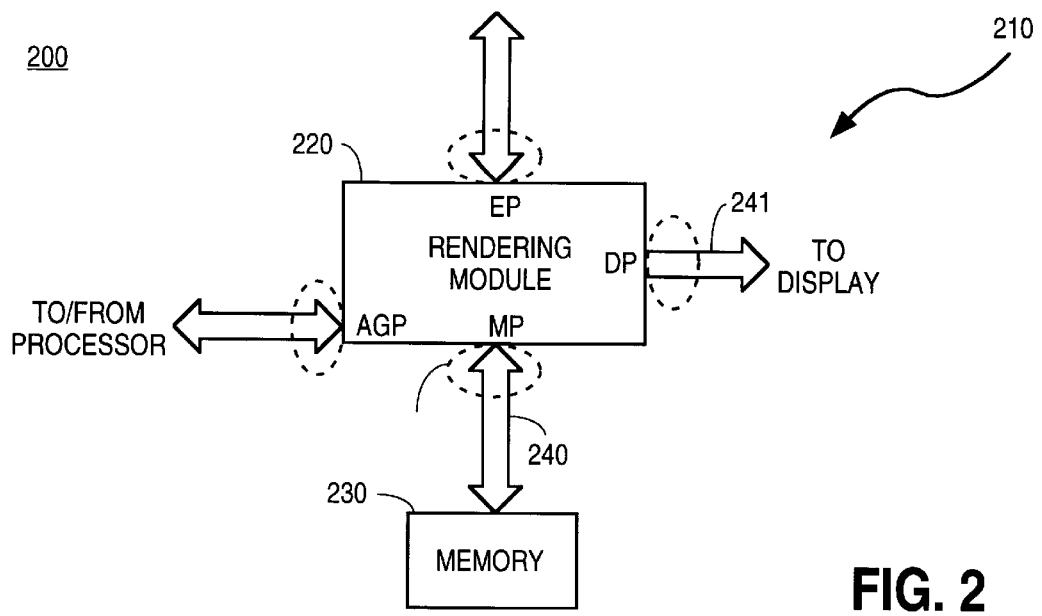
FIG. 2 is a first illustrative embodiment of a scalable graphics subsystem defined by the present invention.

Referring now to FIG. 2, a first embodiment of a scalable graphics subsystem is shown. The scalable graphics subsystem 200 includes a first graphics module 210 having a rendering module 220 and a dedicated memory 230. Memory 230 may include non-volatile memory or preferably volatile memory such as Dynamic Random Access Memory (DRAM). Rendering module 220 includes circuitry that creates a display image from input data and obtains information from memory 230 as well as remotely located memory. Rendering module 220 includes a plurality of communication ports that enable data to be received or transmitted to a number of electronic devices.

For example, as shown for illustrative purposes, rendering module 220 includes a memory port (MP) to support communications with dedicated memory 230 over communication line 240. Rendering module 220 further includes an Advanced Graphics Port (AGP) port to support communications with a processor (e.g., a microprocessor, microcontroller, or any other device having processing capability). Rendering module 220 further includes a display port (DP) which supports the transmission of pixel information to a display monitor (not shown) over communication line 241, and an expansion port (EP) which supports communications with one or more graphics modules as discussed below in FIGS. 4–5.

Figure 3:
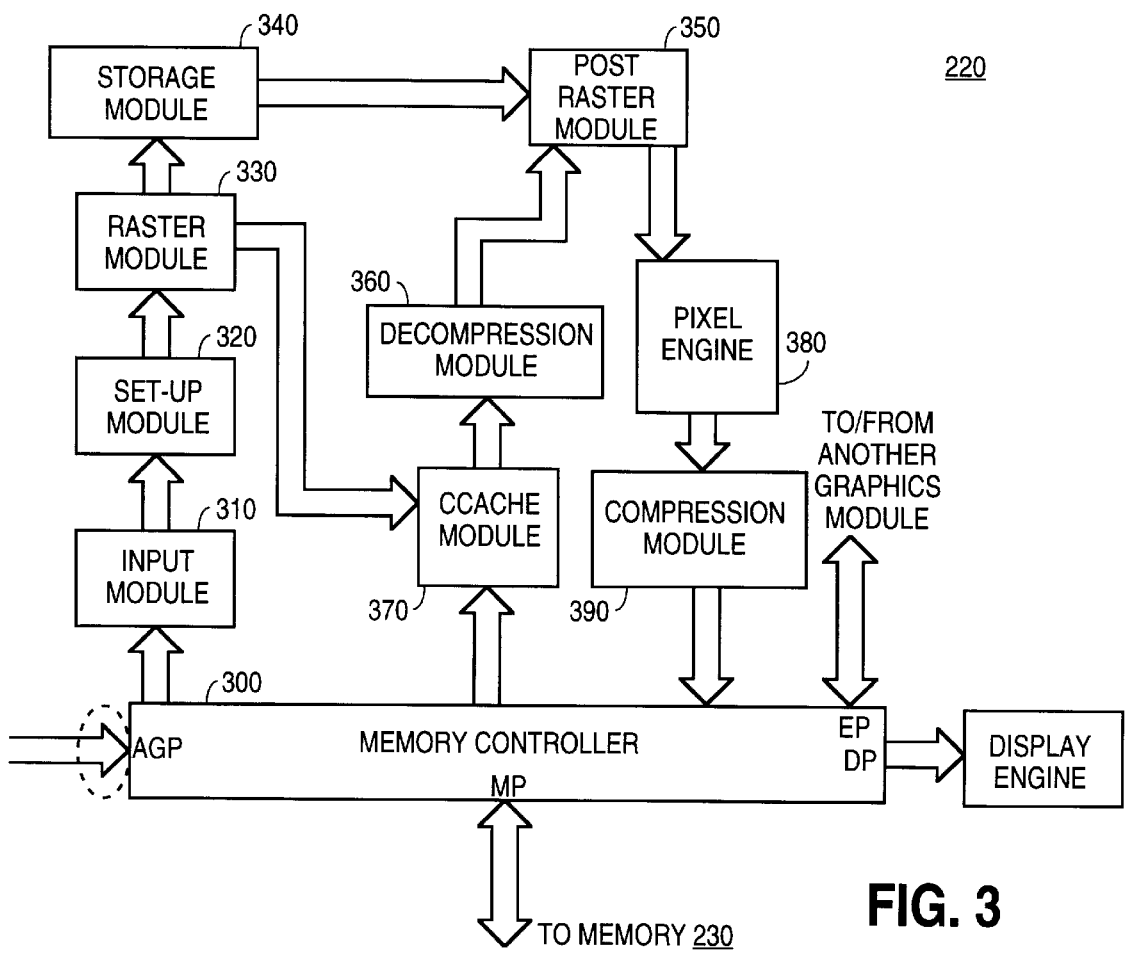
FIG. 3 is an illustrative embodiment of the circuitry implemented with a rendering module of the scalable graphics subsystem of FIG. 2 in order to provide improved memory efficiency and bandwidth usage over the prior art.

Referring now to FIG. 3, rendering module 220 includes a plurality of IC devices, including but not restricted or limited to, a memory controller 300, an input module 310, a set-up module 320, a raster module 330, a storage module 340, a post-raster module 350, a decompression module 360, a compression cache (Ccache) module 370, a pixel engine 380 and a compression module 390. As shown, memory controller 300 receives a series of display primitives from a processor via the AGP port. These display primitives usually include, but are not limited or restricted to vertices, texture coordinates and color, all of which are associated with a selected geographic shape such as one or more triangles. These display primitives are stored within dedicated memory 230 of FIG. 2. Prior to storage, the display primitives may be compressed in accordance with any selected compression format.

Figure 4:
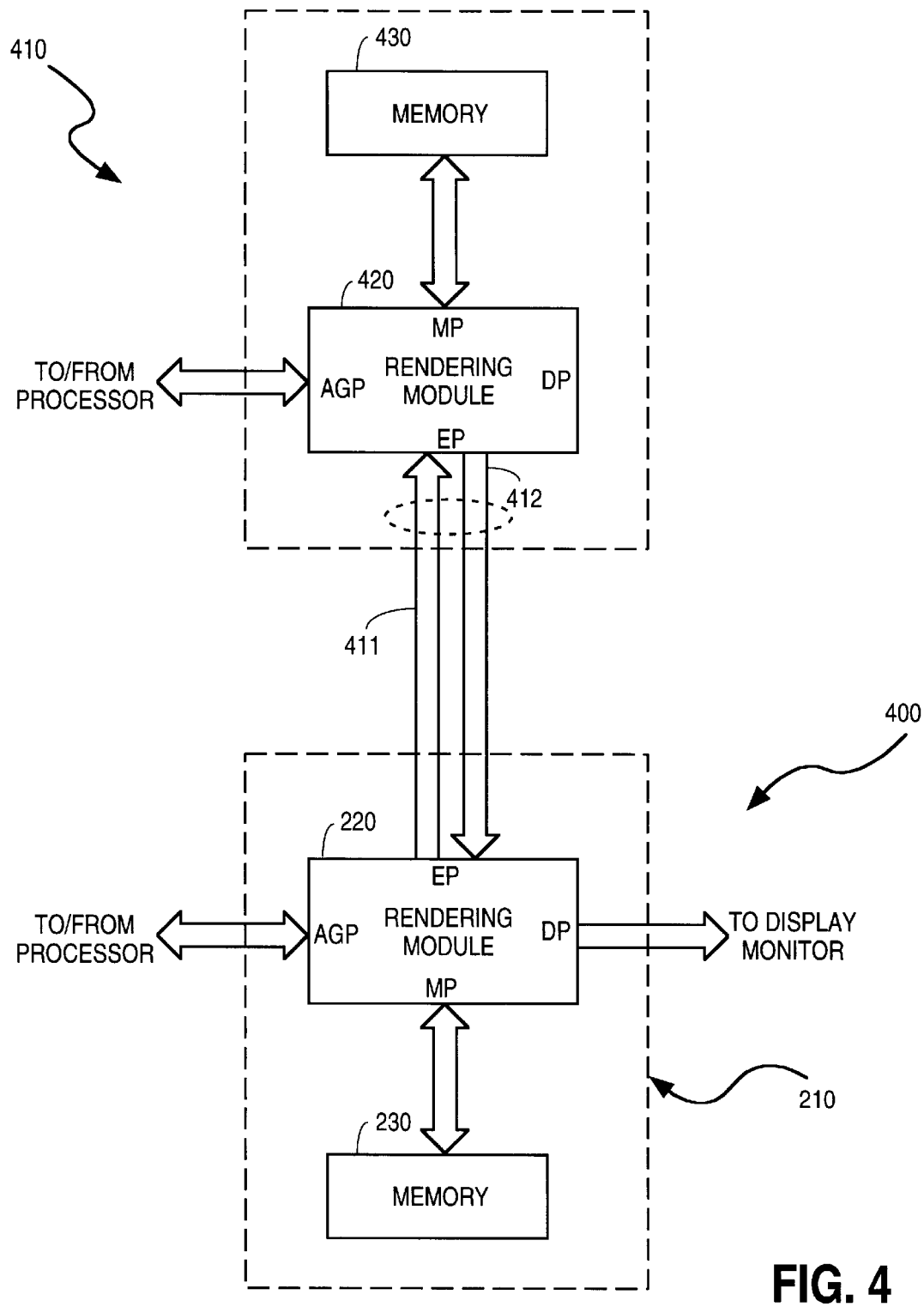
FIG. 4 is a second embodiment of the scalable graphics subsystem in which a pair of rendering modules are coupled together via expansion ports in order to provide improved memory efficiency and bandwidth usage over the prior art.
Figure 5:
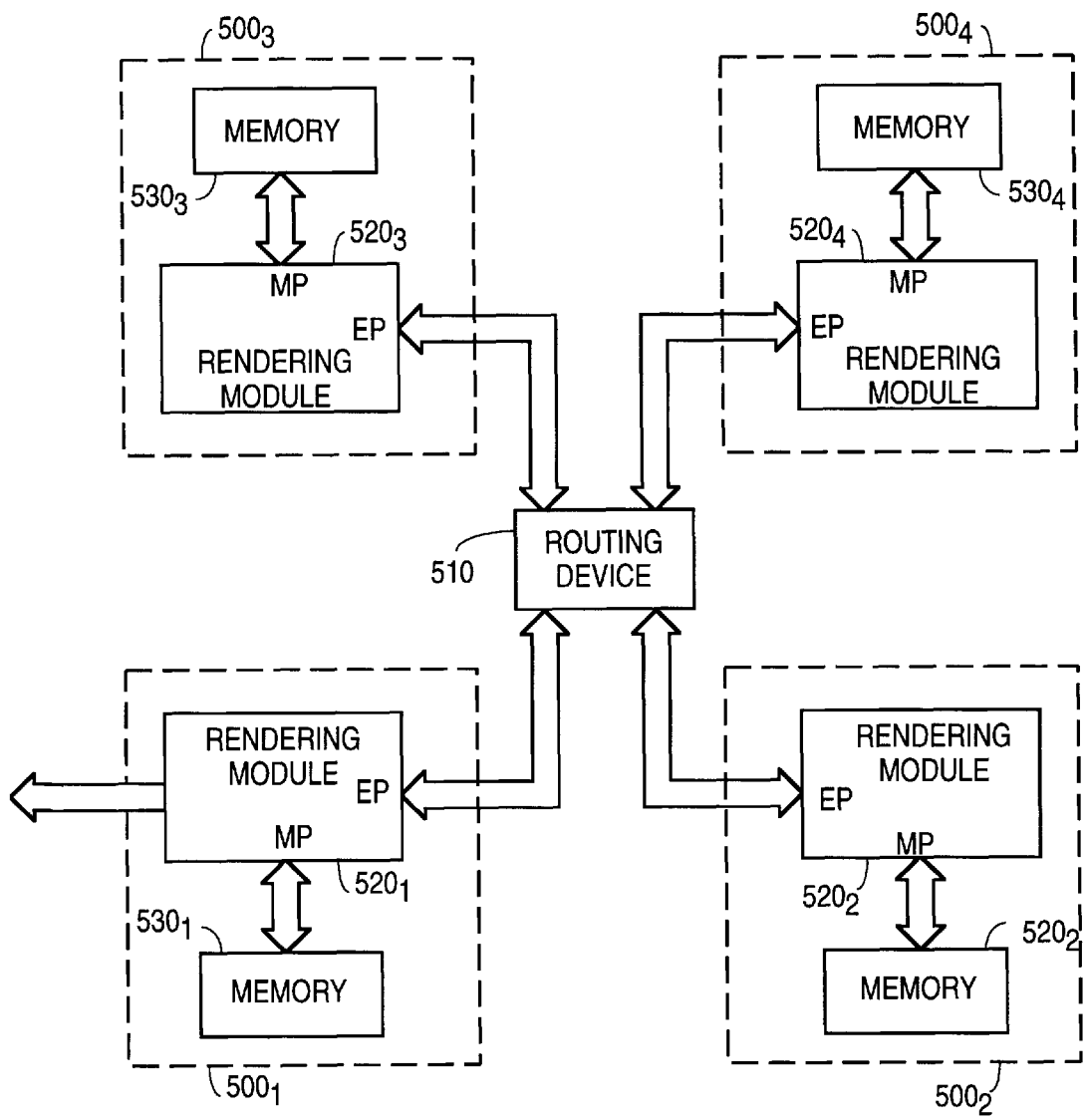
FIG. 5 is a third embodiment of the scalable graphics subsystem in which multiple rendering modules are coupled to a routing device in order to provide improved memory efficiency and bandwidth usage over the prior art.

The input module 310 fetches the display primitives associated with the geometric shape from dedicated memory 230, or perhaps dedicated memory of another graphics module in communication with the EP port of memory controller 300 as shown in FIGS. 4 and 5. This is performed in order to determine whether at least a portion the geometric shape is visible within a small pixel region (e.g., a 32×32 pixel region referred to as a "chunk") of the image that is being rendered by rendering module 220. Such determination is performed by comparing the spatial location of the vertices with the boundaries of the pixel region. If the geometric shape is visible within the pixel region, all information associated with that entire geometric shape, excluding the texture-related information, is transferred to set-up module 320. Otherwise, the display primitives are discarded and another set of display primitives associated with the next pixel region is accessed.

Set-up module 320 receives information associated with the geometric shape and converts this information into "edge equations" which are utilized by raster module 330. Raster module 330 converts these edge equations into plane equations for each pixel in the pixel region. These plane equations will include (i) XYZ coordinates of the pixel, (ii) pixel color (Red, Green, and Blue "RGB" data), (iii) a depth value (also referred to as a "Z" value), a shadowing value (referred to as an "alpha" value) and texture coordinates (S,T). While the pixel coordinates (X,Y,Z), pixel color, alpha and Z values are routed to storage module 340 for temporary buffering, (S,T) coordinates are transferred to Ccache module 370. Ccache module 370 uses the (S,T) coordinates to fetch texture values from dedicated memory 230 under control of memory controller 300 and to load into decompression module 360. The contents of storage module 340 (e.g., pixel coordinates, pixel color, alpha and Z values) are transferred into post-raster module 350 generally concurrent with transmission of the fetched texture values. After post-raster module 350 receives pixel coordinates, pixel color, alpha, Z and texture values, it produces pixel information and performs filtering of the pixel information to provide a smooth pixel-to-pixel transition for the small pixel region being rendered.

The pixel engine 380 receives the filtered pixel information and performs alpha blending to determine whether any pixels within the pixel region are occluded (i.e., covered or obstructed) by an adjacent pixel. If so, the pixel information associated with that occluded pixel is discarded. After the entire region (e.g., chunk) is rendered, pixel engine 380 transmits the pixel information into compression module 390 which compresses the pixel information for storage in dedicated memory 230 until requested by a display engine. The display engine decompresses the compressed pixel information and transmits the pixel information one scan line at a time. Such transmission may occur in a digital format or converted into an analog format for direct transmission to a display monitor.

Referring now to FIG. 4, a second embodiment of the scalable graphics subsystem is shown. The scalable graphics subsystem 400 includes first graphics module 210 interconnected to a second graphics module 410 via a pair of uni-directional communication lines 411 and 412, which may be of any chosen bit width. Of course, it is contemplated that bi-directional communication line may be used. Similar to the above-described architecture of first graphics module 210, second graphics module 410 includes a rendering module 420 coupled to both a dedicated memory 430 and a processor (not shown). The rendering module 420 includes a memory controller (not shown) having an expansion port (EP) capable of receiving and transmitting information from memory controller (not shown) of first graphics module 210. However, in contrast to rendering module 220 of first graphics module 210, rendering module 420 is not coupled to the display monitor.

In this architecture, each rendering module 220 and 420 views the entire memory space dictated by dedicated memories 230 and 430 as one contiguous shared memory. To mitigate performance loss, rendering modules 220 and 420 may be implemented with a generally large internal buffers and rely on a split transaction protocol to remove deadlocks. When a rendering module requests access to memory, it decodes the memory address to determine whether the request pertains to content stored in local memory or in remotely located memory. In the later condition, a request is routed through the expansion port targeting the remotely located memory.

Referring now to FIG. 5, a third embodiment of the graphics subsystem is shown. The graphics subsystem includes a plurality of graphics modules $500_1$–$500_4$ coupled together through one or more routing devices. These graphics modules $500_1$–$500_4$ may include the first graphics module $500_1$ (shown as module 210 of FIGS. 2–4) and the second graphics module $500_2$ (shown as module 410 of FIG. 4).

More specifically, in this embodiment, a routing device 510 establishes a communication link (e.g., an electrical connection) between four (4) memory controllers of rendering modules $520_1$–$520_4$ of graphics modules $500_1$–$500_4$, respectively. Each memory controller of each rendering module $520_1, \ldots, 520_4$ is coupled to routing device 510 through its expansion port. It is contemplated, however, that other embodiments of scalable graphics subsystems may be expanded by simply attaching one or more routing devices to routing device 510. This embodiment further enables one graphics module (e.g., graphics module $500_1$) to obtain information from or write information to a selected dedicated memory (e.g., $530_2$–$530_4$).

Figure 6:
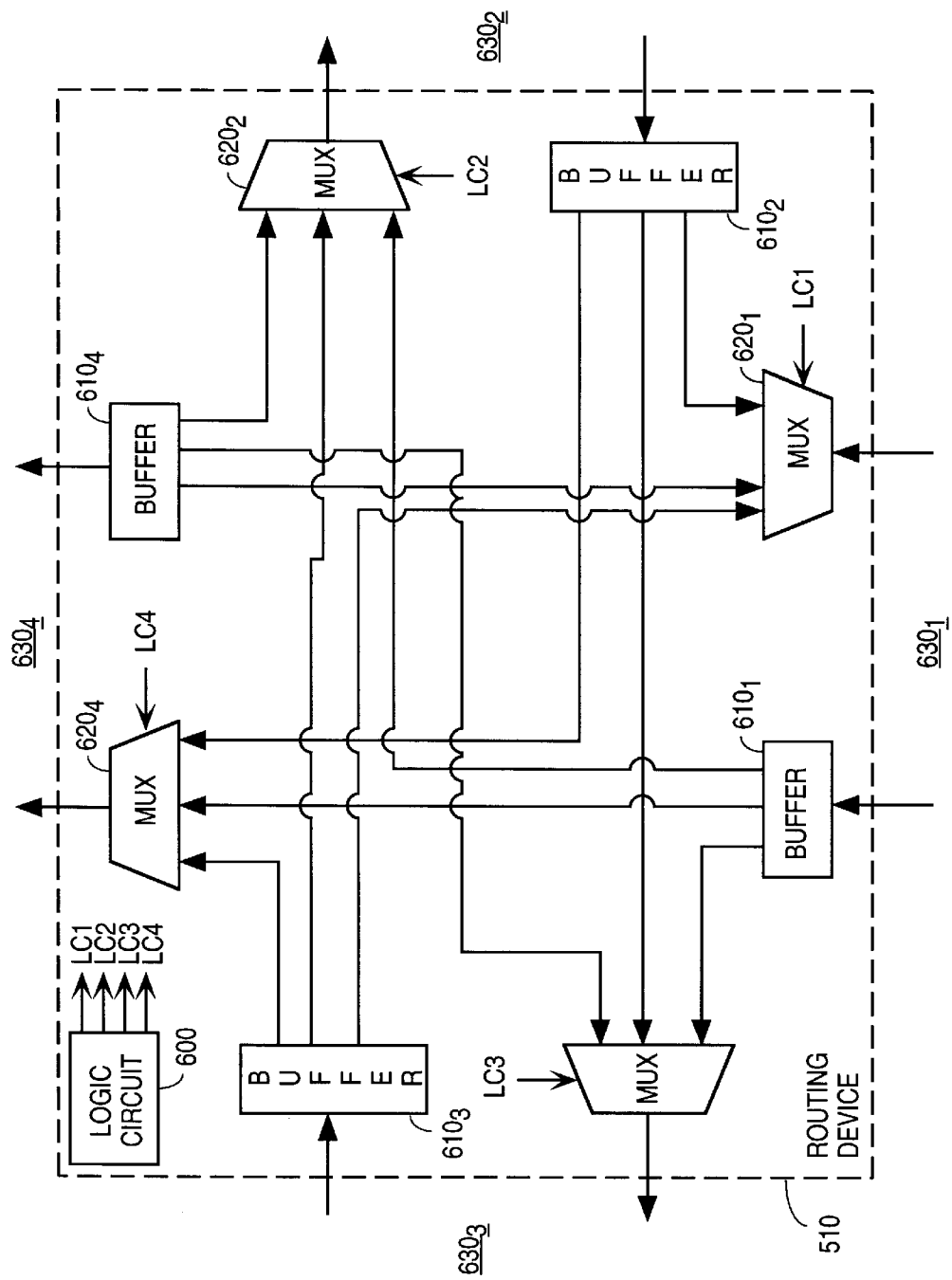
FIG. 6 is an embodiment of the routing device used to connect each rendering module implemented within the scalable graphics subsystem of FIG. 5.

Referring now to FIG. 6, an illustrative embodiment of routing device 510 (e.g., a crossbar) is shown. In this embodiment, routing device 510 includes control logic 600, a plurality of storage devices (buffers) $610_1$–$610_4$, a plurality of select devices (e.g., multiplexers) $620_1$–$620_4$, and four ports $630_1$–$630_4$, each uniquely coupled to expansion ports of graphics modules $500_1$–$500_4$, respectively. Each port $630_1$–$630_4$ includes an input and an output. The input is capable of receiving transfer information (defined below) from its corresponding graphics module and of routing that transfer information to any another graphics module or another routing device (not shown). A general illustration of internal circuitry for one embodiment of routing device 510 is shown.

The input of port $630_1$ is coupled to a first storage device $610_1$ situated to receive transfer information from graphics module $500_1$. This transfer information is loaded into first storage device $610_1$ for temporary buffering. The logic circuit 600 determines whether a targeted graphics module is connected to one of the ports $630_1$–$630_4$ as described below. Thereafter, the transfer information is routed to multiplexers $620_2$–$620_4$, which correspond to those graphics modules or routing devices (not shown) coupled to ports $630_2$–$630_4$. Logic circuit 600 activates one of its select lines LC1–LC4 to enable the transfer information to be output from routing device 510. The same type of configuration applies to ports $630_2$–$630_4$.

Figure 7:
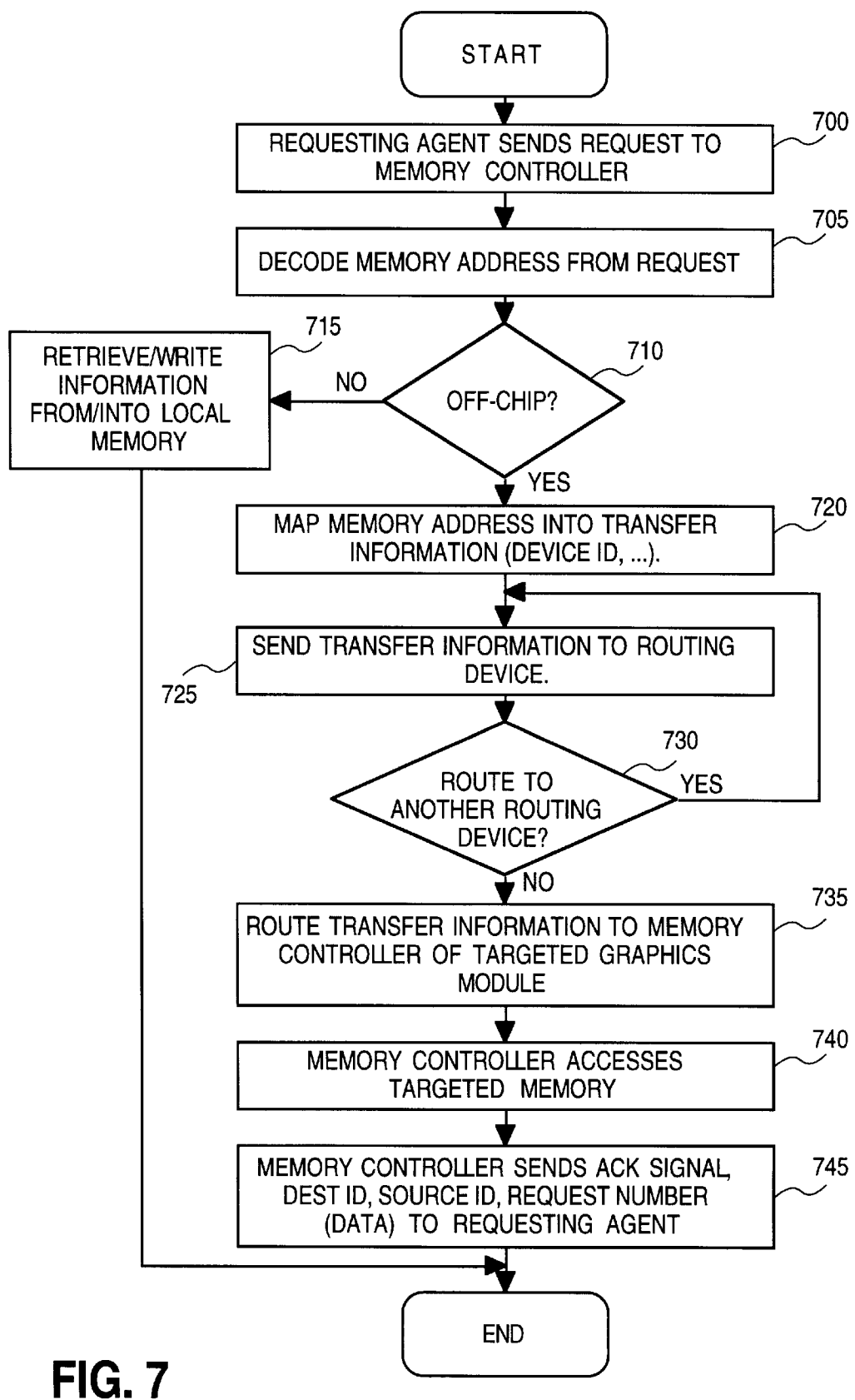
FIGS. 7 is an illustrative flowchart of the operational steps performed by the graphics subsystem of the present invention.

Referring now to FIG. 7, an illustrative flowchart of the data flow of a graphics subsystem of FIG. 5 is shown. The discussion of the data flow also makes reference to data flow associated with a graphics subsystem as shown in FIG. 4. Initially, in step 700, a request is transmitted from a requesting agent to read data from memory ("read request") or write data into memory ("write request"). Originating from a requesting agent (e.g., one of an input module, Ccache module, compression module or display engine of a graphics module), the request includes a memory address, a request code to indicate the type of request such as a read, write or acknowledge, and source information which indicates the graphics module and requesting agent issuing the request. Each requesting agent has a maximum threshold of outstanding requests that it can support, and uses its requests and responses to keep track of the number of requests outstanding and maintain the number to be below the maximum threshold. If a crossbar type routing device is used, this form of flow control ensures that crossbar channels never stall data, which would cause all requests to stall when one takes too long to finish.

In response to receiving the request, the memory controller of the graphics module decodes the memory address to determine whether such address is off-chip (Steps 705 and 710). If the memory address is on-chip, the contents of the address are retrieved (read request) or data is written into dedicated memory associated with that graphics module (Step 715). Otherwise, the memory controller maps the memory address into transfer information including the request code, a device identification (ID), local address, source ID, a request number and an optional priority number (Step 720). The "source ID" is the address of the requesting agent and the request number is a number assigned in numeric order to the request in handling out-of-order requests. The "device ID" represents a code indicating which graphics module is targeted to receive the request. The "local address" is the memory address from which data is retrieved or in which data is written. Of course, data would be routed in the event of a write request.

As shown, transfer information is transferred to the routing device, which checks the device ID to determine whether the targeted graphics module is coupled to the routing device (Steps 725–730). If not, the transfer information is subsequently routed to another routing device until the routing device having the targeted graphics module is located. If so, the transfer information is routed to the memory controller of the targeted graphics module (Step 735). For a read request, the memory controller performs a memory access by reading data stored at the local address of memory associated with the memory controller and by organizing for transmission of that data to the requesting agent. Data transmitted concurrently or immediately subsequent to the transfer information is written into the memory in response to a write request (Step 740).

In the event of a read request, the memory controller sends an acknowledgment (ACK) as part of the request code along with a destination ID, the request number and the data requested. The destination ID is loaded with the source ID of the transfer information. The response is returned by routing such information to a memory controller associated with the requesting agent. The memory controller accesses the destination ID to route the data to the proper requesting agent (Step 745). The request number is used to ensure that data from multiple responses is processed in order.

The present invention described herein may be designed in many different embodiments as evident to one skilled in the art than those described without departing from the spirit and scope of the present invention. The invention should, therefore be measured in terms of the claims which follow.

What is claimed is:

1. A scalable graphics subsystem comprising:
    a first graphics module including a first rendering module to create a display image, the first rendering module coupled to a first memory; and
    a second graphics module including a second rendering module to create the display image, the second rendering module coupled to a second memory and in communication with the first rendering module, the second rendering module having access to information contained within the first memory.

2. The scalable graphics subsystem of claim 1, wherein the first rendering module is coupled to the second rendering module through a communication line.

3. The scalable graphics subsystem of claim 2, wherein the second rendering module including a memory controller having an expansion port coupled to the communication line, the memory controller enables the information to be obtained from the first memory and enables information to be loaded into the first memory.

4. The scalable graphics subsystem of claim 2, wherein the first rendering module is capable of accessing information contained in the second memory.

5. The scalable graphics subsystem of claim 4, wherein the first rendering module including a memory controller having an expansion port coupled to the communication line, the memory controller enables the information to be obtained from the second memory and enables information to be loaded into the second memory.

6. The scalable graphics subsystem of claim 5, wherein the expansion port supports serial data transmissions over the communication line.

7. The scalable graphics subsystem of claim 1 further comprising a routing device coupled to the first rendering module and the second rendering module, the routing device enables the second rendering module to be in communication with the first rendering module so that the second rendering module has access to the information contained within the first memory.

8. The scalable graphics subsystem of claim 7, wherein the routing device further enables the first rendering module to have access to information contained within the second memory.

9. The scalable graphics subsystem of claim 1 further comprising:
a first routing device coupled to the first rendering module; and
a second routing device coupled to the first routing device and the second rendering module, the second routing device enables the second rendering module to have access to the information contained within the first memory by supporting transmission of the information through the first and second routing devices and the first rendering module.

10. The scalable graphics subsystem of claim 1 further comprising:
a first routing device coupled to the first rendering module; and
a second routing device coupled to the first routing device and the second rendering module, the second routing device enables the first rendering module to have access to information contained within the second memory by supporting transmission of the information through the second routing device and the second rendering module.

11. A scalable graphics subsystem comprising:
a first graphics module including a first rendering module to create a display image and a first memory;
a second graphics module including a second rendering module to create the display image and a second memory; and
a first routing device coupled to the first graphics module and the second graphics module so that the first and second modules view memory space, formed by the first and second memories, as one continuous shared memory to enable the second rendering module to access a first set of display primitives contained in the first memory and the first rendering module to access a second set of display primitives contained in the second memory.

12. The scalable graphics subsystem of claim 11, wherein the second rendering module has access to a first set of display primitives contained in the first memory.

13. The scalable graphics subsystem of claim 12, wherein the first rendering module has access to a second set of display primitives contained in the second memory.

14. The scalable graphics subsystem of claim 13, wherein the first rendering module includes a first memory controller coupled to the first memory, the first memory controller includes an expansion port to allow the second set of display primitives to be routed into the first memory controller from the routing device.

15. The scalable graphics subsystem of claim 13, wherein the second rendering module includes a second memory controller coupled to the second memory, the second memory controller includes an expansion port to allow the first set of display primitives to be routed into the second memory controller from the routing device.

16. In a scalable graphics subsystem having at least a first graphics module and a second graphics module, a method comprising the steps of:
receiving a read request from a requesting agent by the first graphics module, the read request including a source identification, a request code and a device address;
decoding the read request to determine if the device address is associated with a local memory of the first graphics module;
mapping the device address into a device identification;
transmitting to a routing device information including the device identification, the request code, an address of the requesting agent, an assigned request number and a memory address;
determining whether a second graphics module identified by the device identification is coupled to the routing device;
accessing data contained at the memory address within a dedicated memory of the second graphics module if the second graphics module identified by the device identification is coupled to the routing device; and
returning the data to the requesting agent.

17. In a scalable graphics subsystem having at least a first graphics module and a second graphics module, a method comprising the steps of:
receiving a write request from a requesting agent by the first graphics module, the write request including data, a source identification, a request code and a device address;
decoding the write request to determine if the device address is associated with a local memory of the first graphics module;
mapping the device address into a device identification;
transmitting to a routing device information including the data, the device address, the request code, an address of the requesting agent, an assigned request number and a memory address;
determining whether a second graphics module identified by the device identification is coupled to the routing device;
writing the data into the memory address of a dedicated memory of the second graphics module if the second graphics module identified by the device identification is coupled to the routing device; and
returning an acknowledgment (ACK) to the requesting agent.

* * * * *